Aug. 29, 1950  P. A. BUCKY  2,520,198
SERVICE INDICATOR
Filed May 20, 1947 4 Sheets-Sheet 1
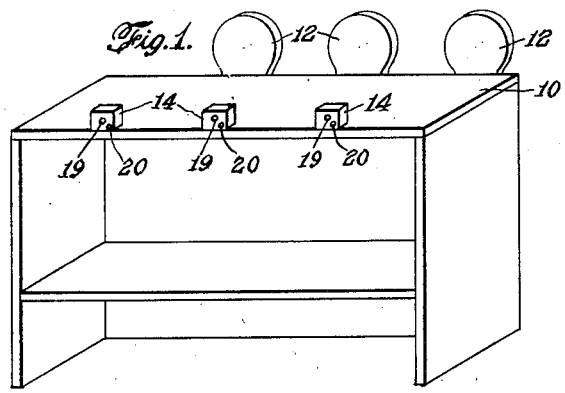
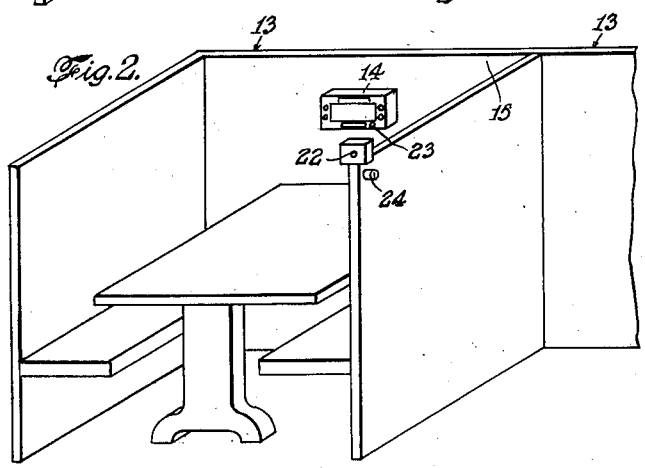
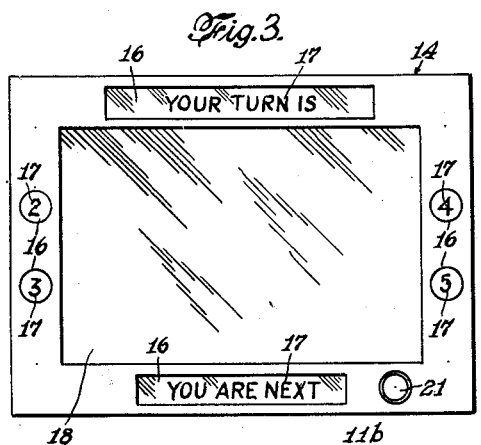
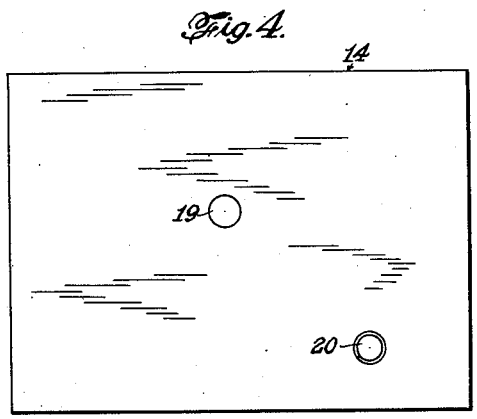
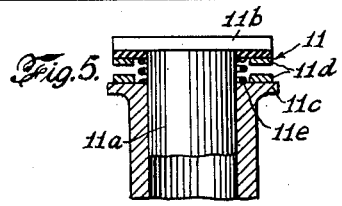
INVENTOR.
PETER A. BUCKY
BY
ATTORNEY

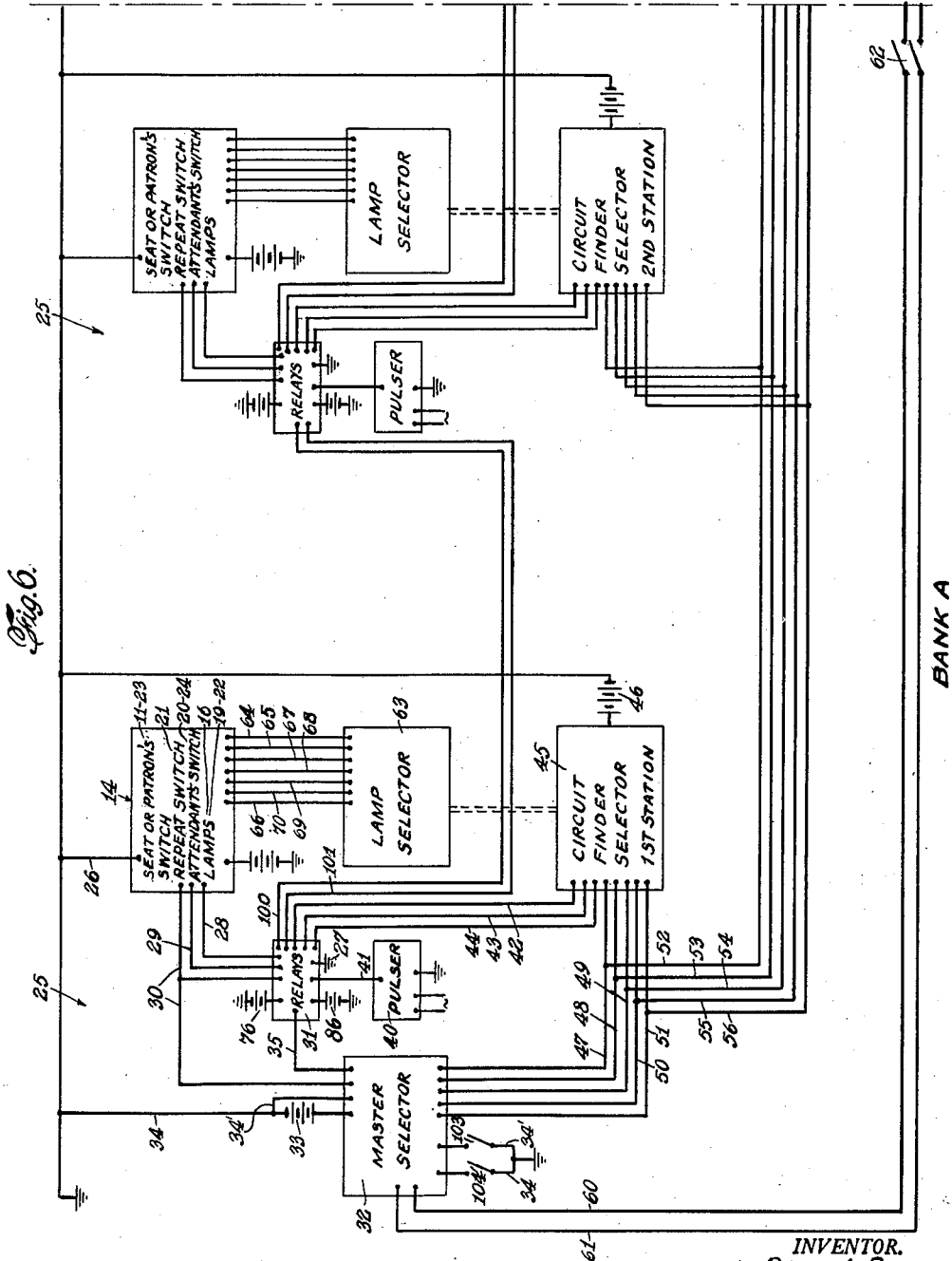

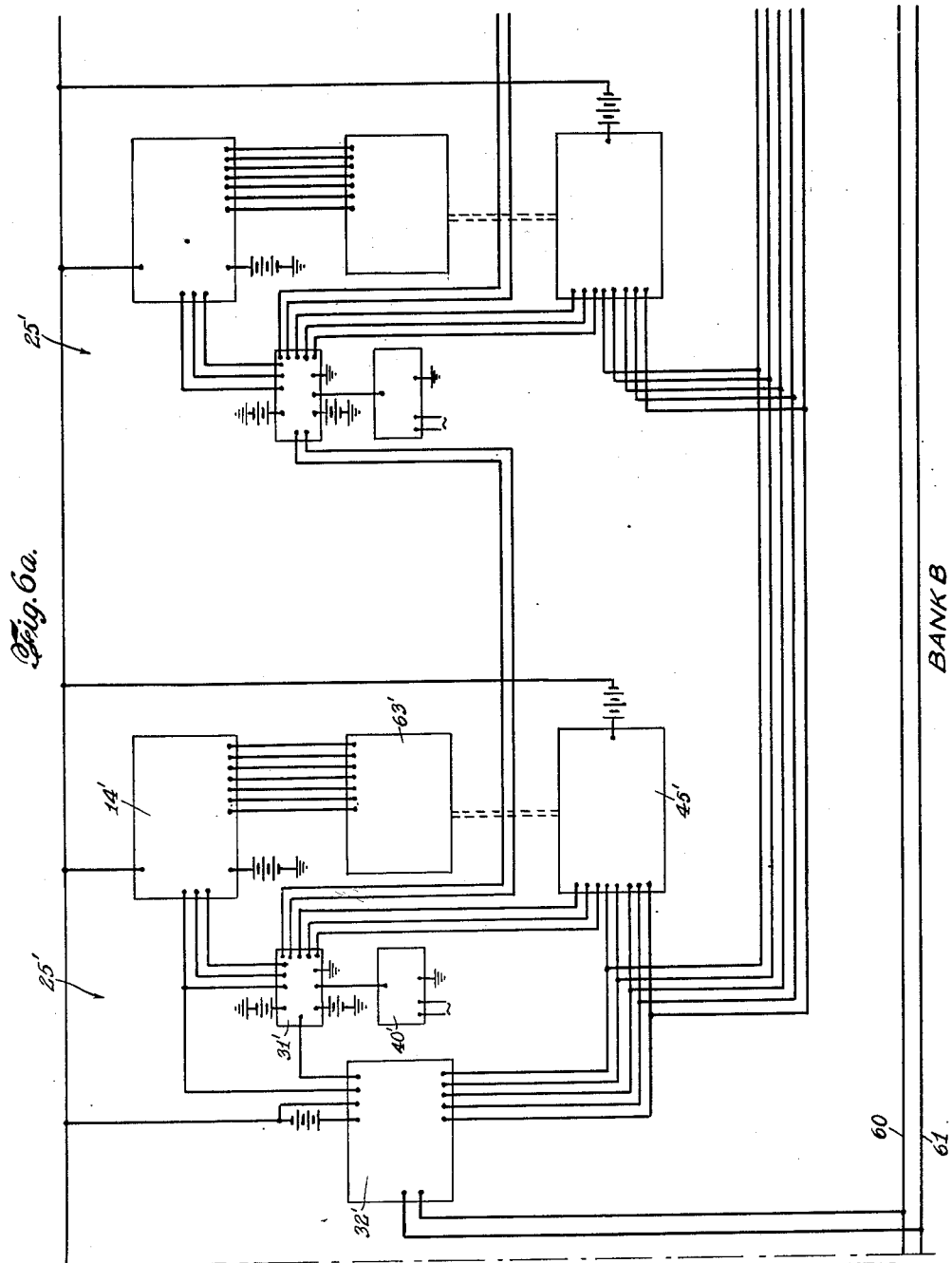

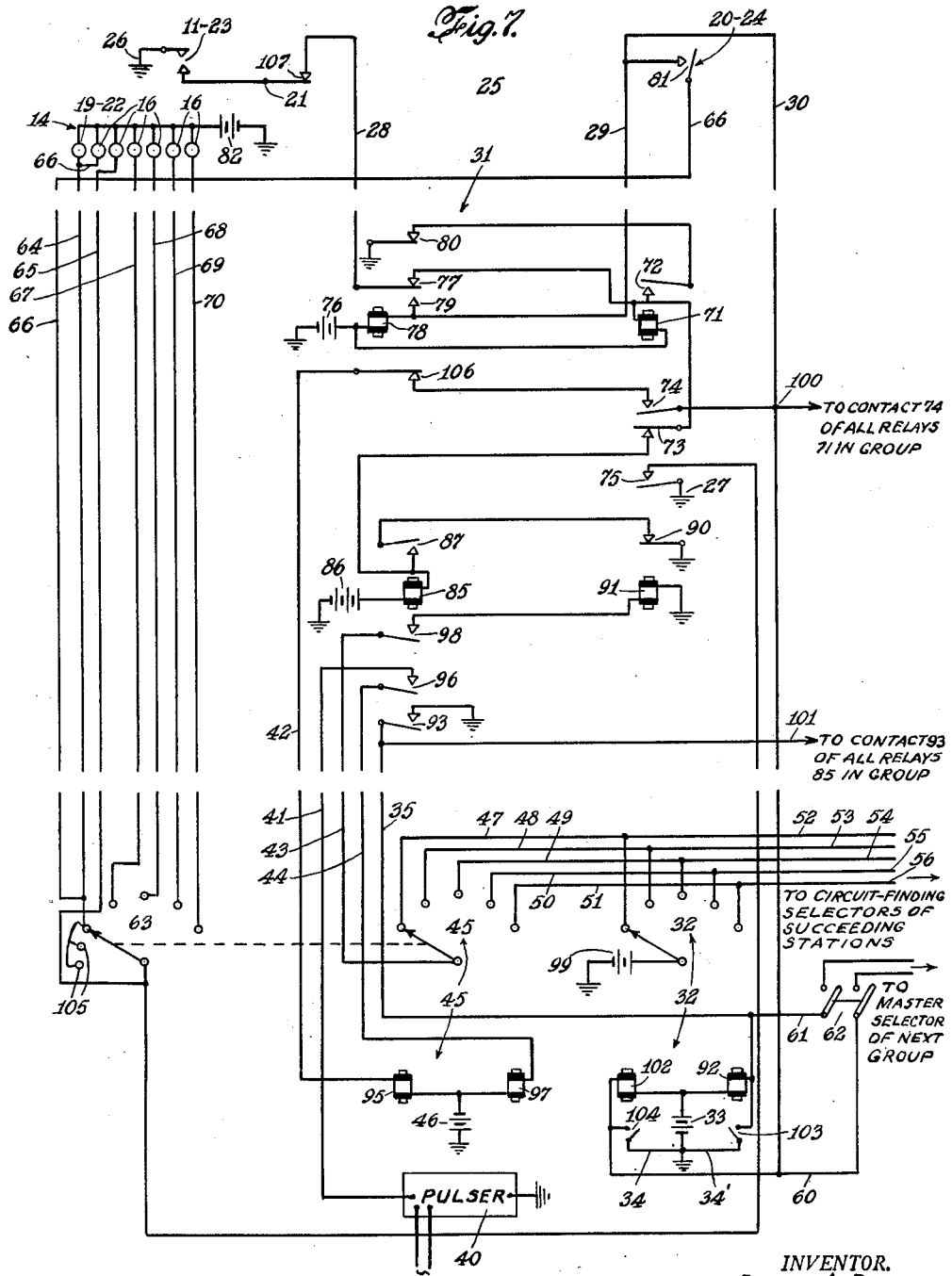

Patented Aug. 29, 1950

2,520,198

UNITED STATES PATENT OFFICE 2,520,198

SERVICE INDICATOR

Peter A. Bucky, Flushing, N. Y., assignor to Tell-A-Turn Corporation, New York, N. Y., a corporation of New York Application May 20, 1947, Serial No. 749,394

7 Claims. (Cl. 177—353)

The invention relates to sequence indication apparatus, operative more especially with reference to the order of serving purchasers of foods, drinks, or commodities generally, that is to say, apparatus which will afford automatically a visual or aural indication of the turn in which the customer's order will be taken by an attendant.

It has for an object to provide signal means whereby a visual or aural indication will be given to designate to the attendant the party next to be served, such signal being effected automatically by the proximity of the purchaser to the point of sale or service, or by a manual operation of the purchaser.

A further object of the invention is to so arrange the indications that both the customer and the one responsible for the service will be given notice thereof.

A still further object of the invention is to provide means whereby, after service has been rendered, the attendant may cause the particular signal to be no longer displayed and a signal corresponding to the patron next in order will then be automatically displayed to apprise the attendant of the proper person from whom to take an order.

Another object of the invention is to prevent effective actuation by an attendant of any attendant's signal nullifying means other than that of the particular station displaying a signal.

In carrying out the invention, provision is made for closing individually respective electric circuits, for example, automatically by the seating of a customer; or, under the control of the customer, as in the provision of a suitable switch or push button which when actuated will effect the circuit closing.

Upon the closing of such a circuit, operation of automatic sequence control mechanism is initiated, said mechanism including a series of multiple relays and lamp selector means for each seat or booth, together with a master selector for the control of signal means for a predetermined number of seats or booths. This will serve to provide immediately at the particular station a suitable signal (as well as accordingly modifying signals at other stations of a group), for example, such as is afforded by an electric lamp, and cause the order of service to be indicated both to the customer and the attendant. These indications will change in accordance with the progression of service until a final signal is provided as, for erample, the display of a legend such as "You Are Next." When the order is then taken by the attendant, the latter operates a further switching means which restores that particular station to its initial status; and if further service should be required thereat, a repeat switching means operated by the customer will again place the particular station under the sequence control with indications as aforesaid.

The nature of the invention, however, will best be understood when described in connection with the accompanying drawings, in which:

Figs. 1 and 2 are isometric projections illustrating various adaptations of the invention, Fig. 1 representing a bar or counter type of service fixture equipped with the novel indicator system, and Fig. 2 a booth type.

Figs. 3 and 4 are respectively a front and a rear elevation of an indicator unit which may be utilized in the novel sequence indication system.

Fig. 5 is a fragmentary vertical section illustrating a seat-operated switch.

Figs. 6—6a (sheets II and III) is a block diagram illustrating the electrical connections involved for two groups of stations; while Fig. 7 is a wiring diagram for a single station.

Referring to Fig. 1 of the drawings, 10 designates a counter or like installation as commonly employed in connection with the sale of various commodities; and, in the particular embodiment shown, the counter is provided with stools or seats located in front of the counter, which seats may each be equipped with a circuit-closing switch 11 and of a nature more especially disclosed in Fig. 5. As indicated, the switch mechanism may conveniently be provided in the nature of an annular member fitted over the plunger portion 11a of a stool and inserted between its head 11b and the flange 11c of the stool pedestal, said switch comprising a pair of contact rings 11d separated normally by a helical spring 11e but which permits the rings to contact each other upon a seat becoming occupied. The said seats are represented in Fig. 1 by their backs 12 which project above the top of the counter. Or, the seating arrangement may be in the nature of a booth 13, Fig. 2 of the drawings.

In the former embodiment, Fig. 1, there is provided along the rear edge of the counter 10 and opposite each of the seats indicated at 12 an indicator unit 14, which in the latter embodiment, Fig. 2, may be secured to the rear wall 15 of the booth, said indicator units in either case being clearly visible to the occupants desiring service. A unit 14 is provided, by way of example, with a plurality of lighting elements such as the electric lamps 16, Fig. 3, designed to indicate the order of service, in the instant embodiments seven lamps. It will be understood, of course, that other indicator means may be utilized, such as aural indicators (not shown). As indicated in Fig. 3, the said lamps are caused then to illuminate indications 17 at the front of the indicator, such as "Your Turn Is," "5," "4," "3," "2," and "You Are Next," these being arranged, preferably, marginally about a central field portion 18 which may present, if desired, suitable matter for advertisement or entertainment, either of the stationary or motion type.

There is associated with the indicator unit, for example, at the back thereof, a further lamp 19 which, when energized, will serve to notify the attendant that this particular station is the next one to be served; and a control or clearing switch member such as the push button 20 is provided for each indicator unit whereby the attendant may restore the circuit for the particular station to its initial status. A further switch or push button 21 is provided for each indicator unit should additional service be desired, it being understood that the order of such service will then be subject to completion of service at other stations which may have in the meantime been occupied. In the case of the booth arrangement, the attendant's indicator lamp 22 may be located on top of the booth for ready visibility and the order and repeat-order switches are consolidated in a single push button or the like 23. The restoring switch 24 is located at some point on the wall convenient to the attendant, and is preferably in the nature of a key-operated switch to provide against tampering therewith.

When a customer occupies a seat 12 or presses the order-repeat-order button 23, a relay and selector system, Figs. 6-6a and 7, becomes energized to determine the particular sequence of service for such occupant—a like system, with the exception of a master relay, being provided for each station or seat and the respective systems being interconnected as hereinafter set forth so that all stations are influenced by the particular action taken at any one of them. All of the station systems, however, are subject to a single master selector; and, if desired, a plurality of groups of stations, each with its own master selector, may be integrated and arranged for interconnection through their respective master selectors for common operation.

As indicated in the block diagram, Figs. 6-6a, one group or bank A of stations may be consolidated with a similar group or bank B, etc., which may comprise either the same number of stations or a different number from that of the bank A. In the said Figs. 6-6a, two stations are indicated at 25, 25' for each group and at each of said stations is included the seat switch 11 and patron's repeat switch 21, or the patron's order and repeat switch 23; also, the attendant's switch 20 or 24; as well as a plurality of lamps 16 and 19 or 22.

Grounding connections 26, 27 are made respectively from the seat switch 11 and from a relay controlled indirectly by the attendant's switch 20 or 24; and through the leads 28, 29 and 30 connection is made to the bank of relays 31, one lead, as the lead 30, being continued also to the control of a master selector 32 to which is connected a source of power 33 grounded at one side. Further ground connections 34, 34' are provided to said selector; and a connection 35 is made to relay bank 31 therefrom.

A power impulse-producing or pulser member 40 is connected to relay bank 31 through lead 41; and three leads 42, 43, and 44 extend also from said relay bank to a circuit finder selector 45. This selector has connection with a source of power 46, one side of which is grounded. The said selector has connection from its contact points, also, to corresponding contact points of said master selector 32 through the leads 47, 48, 49, 50, and 51; as well as through the leads 52, 53, 54, 55, and 56 to the remaining circuit-finding selectors of the particular bank A, the latter leads being connected respectively to said leads 47, 48, 49, 50, and 51 to this end.

If the groups of stations are integrated into several banks A, B, etc., and it is desired to operate the banks jointly instead of severally, further leads 60, 61 are arranged to interconnect the selected banks through their respective master selectors 32, 32', etc., connections being made respectively to the leads 30 and 35 thereof, Fig. 7. The master selectors then operate in unison to control the various apparatus of stations 25, 25', etc., including the circuit-finding selectors 45' with lamp selectors 63', relay banks 31', lamp units 14', etc., of the additional group or groups. A single-throw double-pole switch 62, etc., may to this end be provided in the connection leads 60, 61 to place said master selectors 32, 32' in parallel with each other.

The said circuit-finder selector 45 is powered from the pulser 40 and from the source 46; and it is mechanically coupled to a further selector 63 for energizing synchronously with the operation of selector 45 and successively the lamps 16 and 19 or 22 of units 14 at the indicator stations 25. Connecting leads 64, 65, 66, 67, 68, 69 and 70 of the various lamps are provided to this end and for the attendant's switch between the selector 63 and a station indicator 14.

The operation of the various elements, upon closing of the seat switch 11 (or the manually operated booth switch 23) will best be understood by reference to the wiring diagram, Fig. 7. When switch 11 is thus closed upon the seating of a patron, for example, a circuit is grounded through the connection 26 to energize the coil of a first relay 71 comprising four sets of contacts 72, 73, 74 and 75, power being derived from the source indicated at 76 having one side grounded. The energizing circuit includes also the normally closed contact 77 of a second relay 78 having its coil connected to the ungrounded side of the source of power 76. A normally open contact 79 of relay 78 is designed to be closed when its coil is energized, which at the same time opens the contact 77 of said relay.

Relay 71 is designed to be held in by the closing of switch 11 in the closing thereby of contact 72 controlled by said relay through the ground connection of a normally closed contact 80 controlled by relay 78. Relay 71 will thus be held in irrespective of any opening of the circuit at switch 11 subsequent to its initial closing upon seating of an occupant or manual operation of switch 23 in the booth type. The said relay may be released then only by actuation of the attendant's switch 20 or 24 to complete the power connection to the relay 78, as will hereinafter be set forth.

With relay 71 thus maintained active until the entire station is cleared by an attendant and restored to its initial status, the following operations take place. Relay contact 75 is closed upon energization of said relay 71 to provide a ground connection thereby at 27 for electrical energy from a source 82 and controlled through the selector arm of lamp selector 63 to power successively the lamps 16 and eventually lamp 19 or 22 as said arm is moved by the selector under control of the circuit-finding selector 45 to which it is coupled mechanically. One of the lamps 16, however, is independently energized irrespective of the selector control through the lead 65 and immediately upon energization of relay 71. The particular one of the lamps 16 to be energized at this time, indicating the turn number 17 for order of service, will depend upon the location of the circuit-finding selector arm as positioned under the influence of the master selector 32 through circuit-finding selector 45, in accordance with the status of the other seat switches.

Closing of the seat switch 11, also, has momentarily energized the coil of a third relay 85, from power source 86, through the normally closed contact 73 of relay 71, closing thereby contact 87 of said relay 85 to hold the latter in through the ground connection afforded by the normally closed contact 90 of a fourth relay 91. This serves to actuate the master selector 32 through lead 35 to its coil 92 as a result of the operation of the relay 85 in closing the circuit at the grounded relay contact 93, thereby to advance the said selector one step.

The energization of relay 71 has also effected the closing of a circuit at the contact 74 which controls the return movement of selector 45 through its subtract coil 95, this circuit normally being further interrupted at the attendant's switch contact 81. The advance movement of said selector 45 is controlled by the pulser 40 through connection 41 in which is included the normally open contact 96 of relay 85. When this contact closes upon energization of said relay 85, the add coil 97 of selector 45 functions, each pulse transmitted serving to advance the selector one step which will be continued until the arm of selector 45 reaches a position similar to that of the master selector arm, at which time the particular circuit of the leads 47—51 interconnecting the two selectors 45 and 32 will serve to complete through lead 43 and relay 85 contact 98 a circuit through the relay 91 to the grounded power source 99 of the master selector. The said relay 91 then interrupts the holding circuit for relay 85 at the contact 90; and as this relay falls out, the pulser circuit is interrupted at contact 96, as well as the master selector control circuit, at contact 93, for advance of its arm by control under influence of coil 92 of the particular selector.

As additional stations of a group are put into service, the single master selector 32 is accordingly advanced—one step for each energizing station; and upon service being rendered, the attendant operates the switch 20 or 24 which subtracts one step at all of the circuit-finding selectors and their master relay, the various stations in the case of several groups of stations being interconnected through leads 100 and 101, the former being connected to the subtract coil lead 30 of the master relay as well as to the contact 74 and the latter to the add coil lead 33 of said master relay and to the contact 93. When a circuit-finding selector 45 of a station has been advanced as aforesaid into correspondence with the master selector, the proper lamp indication will have been made through selector 63 and power from the source 82.

Each time an attendant's switch 20 or 24 is operated to effect the closing of a circuit at its contact 81, a ground connection is established at 27 through lead 66, provided the selector 63 has reached the attendant's light position. Also, a power circuit is provided through the coil of relay 78 to open at the contact 77 the seat-controlled circuit to relay 71 which thus becomes de-energized. At the same time, this operation of switch 20 or 24 serves to close the circuit to the subtract coil 102 of the master selector to bring its control arm back one step as well as to power the subtract coil 95 of circuit-finding selector 45 prior to the opening of contact 74.

In the event that the master selector should jump ahead or fall behind with respect to the lamps controlled thereby, provision may be made for manual adjustment of the selector through an add switch 103 and a subtract switch 104 in respective circuits shunting the control magnets 92 and 102. Also, to prevent possibility of confusion of indications should, for example, several seats of a bank of installations be occupied simultaneously, one or more points 105 may be included on the indicator controlling selector 63 ahead of the normally first or end point and to which they are electrically connected. Should such simultaneous occupancy then occur, there might be two or even three like indications for service.

De-energization of relay 71 opens the hold-in circuit at contact 72 and at contact 75 the ground connection to selector 63 which causes the lamps at the particular station to become de-energized. Also, the contact 73 closes; and release of the contact 74 of said relay 71 will cause the subtract circuit of selector 45 to be opened. This circuit is further opened at a normally closed contact 106 of relay 78 when relay 78 is energized but said relay becomes de-energized as aforesaid when attendant's switch is again opened, its closure being only momentary in the case of the manually operated switch station, or when an occupant has left the seat in the seat-switch type. The particular station is placed as a result of the same in condition for a new patron or for a repeat order.

Should it be desired to effect at an occupied seat a repeat service after the aforesaid restoration of the normal status of a station following the operation of switch 20 or 24 by an attendant, it is necessary for the patron merely to operate the repeat order switch 21 to open momentarily at its contact the ground-connected hold-in circuit for relay 78. This restores the circuit at contact 77 for operation again of relay 71 upon release of repeat switch 21 to complete the circuit at its contact 107, which thus initiates a second cycle with respect to the particular station. In the case of a manually operated station, rather than a seat-switch operated one, the order and repeat-order switches are combined into the single manually-controlled switching member 23 which is, preferably, of the momentary closed type (not shown). In this arrangement, relay 78 will remain energized only so long as the attendant's switch 24 is held closed but for a time sufficient to effect the aforesaid cycle and clear the particular station for a repeat operation.

I claim:

1. In a service system: the combination with a plurality of installations at which service is to be rendered, independently operable electrical circuit closing means associated respectively with each installation and respective circuits thereat adapted to be closed by a corresponding closing means; of indicating units for the respective installations, each of said units comprising a plurality of signal elements adapted to indicate sequence of service when a corresponding one of the circuits thereat is closed by its closing means, the units being so located with respect to each of the installations as to apprise one to be served of the service sequence for the particular station at which a signal element is energized; relay means adapted for actuation upon the closing of any of said installation circuits, a single electrically operable master selector under control of the relay means for successive advance thereof, and circuit-finder selector means corresponding in number to the individual installations for controlling their respective indications, the contacts of each circuit-finder selector means being electrically connected with corresponding contacts of the master selector; pulser means controlled by said relay means for advancing a circuit-finder selector means; and manually operable individual circuit-closing means associated respectively with each of the indicating units, to effect through said relay means energization of the master selector for actuation in a reverse direction to clear the indications only of the indicating unit of the corresponding station previously effected by the closing of its electrical circuit means as well as to set back any advanced circuit-finder selector means.

2. The service system according to claim 1, wherein an indicating means is associated with a unit at each installation to apprise an attendant of the particular installation to be served, said indicating means being electrically connected with and controlled by a corresponding circuit-finder selector means.

3. The service system according to claim 1, wherein the circuits at the respective installations are each provided with a circuit opening-closing means for establishing a repeat service indication through the relay and selector means.

4. The service system according to claim 1, wherein the installations are integrated into a plurality of groups for service independently by respective attendants, a master selector means is provided for each group, and switching means are provided for electrically interconnecting through the respective master selector means of the several groups selected groups for common service by a single attendant.

5. The service system according to claim 1, wherein an auxiliary selector is provided and is operable with a circuit-finder selector means which controls the signal elements of a corresponding installation indicating unit, said auxiliary selector being provided with contact points for energizing respectively the unit elements and with contact points additional thereto and electrically connected to an end one of the first-named contact points.

6. The service system according to claim 1, wherein the master selector means controls a predetermined number of the indicating unit installations and corresponding manually controlled circuit-closing means are provided and are adapted for electrical connection therewith to affect means for selectively causing an advance or a retraction of the master selector.

7. The service system according to claim 1, wherein the master selector means controls a predetermined number of the indicating unit installations, circuit-finder selector means are provided for each installation, and an auxiliary selector is provided to control the signal elements of the respective installation units, said auxiliary selectors being mechanically connected with the respective circuit-finding selector means.

PETER A. BUCKY.

REFERENCES CITED

The following references are of record in the file of this patent:

UNITED STATES PATENTS

| Number | Name | Date |
| --- | --- | --- |
| 1,929,402 | Belliveau | Oct. 10, 1933 |
| 2,008,909 | Hershey | July 23, 1935 |
| 2,302,155 | Taylor | Nov. 17, 1942 |
| 2,407,411 | Falis | Sept. 10, 1946 |

FOREIGN PATENTS

| Number | Country | Date |
| --- | --- | --- |
| 291,805 | Germany | May 12, 1916 |